US006667460B2

(12) United States Patent
Nowotni et al.

(10) Patent No.: US 6,667,460 B2
(45) Date of Patent: Dec. 23, 2003

(54) INNER TORCH

(75) Inventors: Detlef Nowotni, Grabenstetten (DE); Christian Wanke, Senden (DE); Tilman Haug, Weissenhorn (DE); Patrick Izquierdo, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/093,830

(22) Filed: Mar. 11, 2002

(65) Prior Publication Data

US 2002/0130109 A1 Sep. 19, 2002

(30) Foreign Application Priority Data

Mar. 10, 2001 (DE) ........................................ 101 11 565

(51) Int. Cl.[7] .................................................. B23K 9/12

(52) U.S. Cl. .............................. 219/137.31; 219/137.8; 219/76.14

(58) Field of Search ....................... 219/137.61, 137.31, 219/137.8, 76.14; 427/455, 456, 446, 449

(56) References Cited

U.S. PATENT DOCUMENTS 3,901,441 A * 8/1975 Kasagi ........................ 239/81
4,624,410 A * 11/1986 Rogers ........................ 239/83
5,622,753 A * 4/1997 Shepley et al. ............. 427/453
6,076,742 A * 6/2000 Benary ........................ 239/84
6,390,389 B1 * 5/2002 Tudor et al. ................ 239/290

FOREIGN PATENT DOCUMENTS

DE 19841617 3/2000

* cited by examiner

*Primary Examiner*—M. Alexandra Elve
*Assistant Examiner*—Kevin L. McHenry
(74) *Attorney, Agent, or Firm*—Crowell & Moring LLP

(57) ABSTRACT

An inner torch for the electric-arc spraying of cavities, in particular of cylinder contact surfaces. The inner torch as at least two torch tubes for heating electrodes. The electrodes are provided for melting purposes and are designed as wires which can be burned away in an electric arc. The inner torch also has a gas feed for a process gas which is provided for transporting and spraying the molten wire material in the direction of the cavity surface which is to be coated. The wires are guided towards one another, by way of the torch tubes, wherein at the outlet and in the region of the electric arc, the electric arc of the electrodes wires, which is arranged in the contact region of the wires, is arranged in the region of the flow of the discharged process has, referred as the main gas arranged transversely to the main transporting direction of the wires. Furthermore, in addition to being bent towards one another, the wires are also bent transversely to this direction.

14 Claims, 1 Drawing Sheet

INNER TORCH

This application claims the priority of Germany Application No. 101 11 565.2-45 filed Mar. 10, 2001, the disclosure of which is expressly incorporated by reference herein.

BACKGROUND AND SUMMARY OF THE INVENTION

The invention relates to an inner torch for the electric-arc spraying of cavities, in particular of cylinder contact surfaces, as is known, for example, from the generically determinative German Patent DE 198 41 617 A1 which discloses an inner torch for the electric-arc spraying of cavities, in particular of cylinder contact surfaces. The inner torch has two torch tubes which are provided with heating electrodes made of wire. The electrodes are melted in an electric arc. The inner torch also has a gas feed for a process gas which is provided for transporting and spraying the molten wire material in the direction of the cavity surface to be coated. The (electrodes) wires are guided towards one another, by way of the torch tubes, at the outlet and in the region of the electric arc. The electric arc in the contact region of the wires, is arranged in the region of the flow of the discharged process gas. The flow of the discharged process gas, referred to as the main gas flow direction for the sake of simplicity hereinbelow, is arranged transversely to the main transporting direction on the wires, this direction being defined by the torch tubes. Layers which are sprayed by such an inner torch onto, in particular, a metallic substrate, preferably a cylinder contact surface, have, inter alia, a high porosity and/or pores with an unacceptable large average pore diameter.

The object of the invention is further to develop the previously known inner torch to the effect that it gives rise to sprayed layers which have a lower porosity and/or pores with a smaller average pore diameter.

The object is achieved according to the invention by an inner torch wherein the wire is bent at least twice so that the contact point of the two wires, and thus the electric arc itself, has high positional stability in the event of fluctuations in current and/or voltage. It is this positional stability which results in the layers which are sprayed by the inner torch according to the invention having a negligible porosity. Furthermore, it is also the case with these layers that the average pore diameter is smaller than in the case of the prior art.

Other objects, advantages and novel features of the present invention will become apparent from the following detailed description of the invention when considered in conjunction with the accompanying drawings.

BRIEF DESCRIPTION OF THE DRAWINGS

The invention is explained in more detail with reference to an exemplary embodiment illustrated in the figures, in which.

DETAILED DESCRIPTION OF PREFERRED EMBODIMENT

Figure 1:
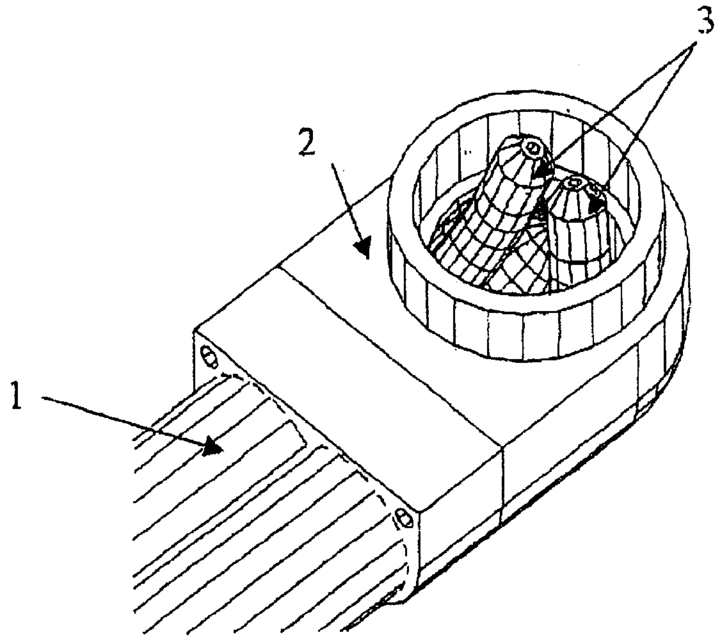
FIG. 1 shows a perspective plan view of an inner torch with the nozzle removed.
Figure 2:
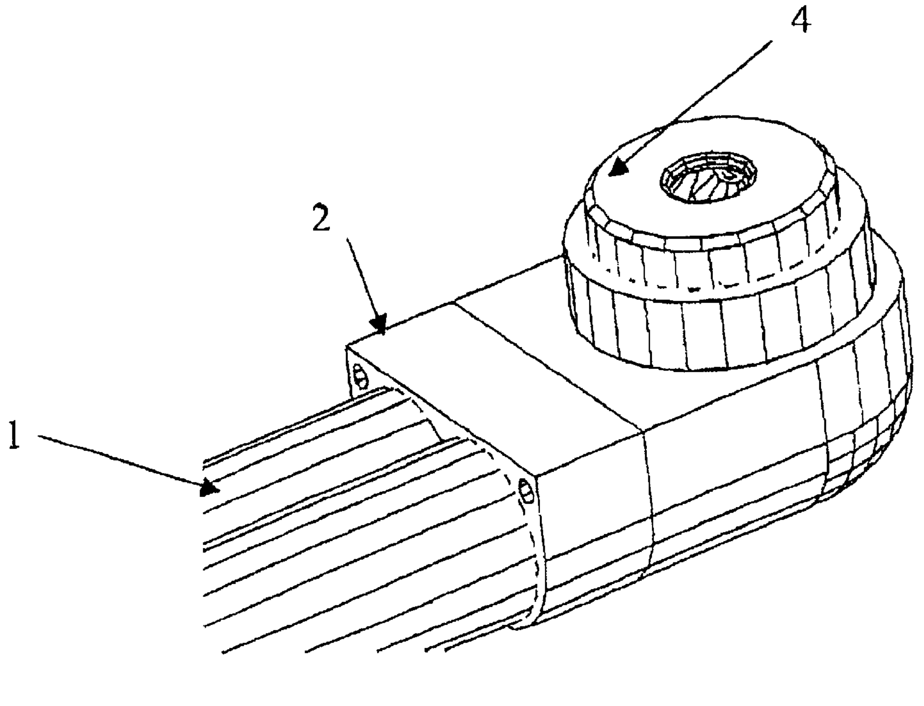
FIG. 2 shows the torch according to FIG. 1 with the nozzle closed.

FIG. 1 illustrates the front region of an inner torch as is used, in particular, for the electric arc spraying of cavities, preferably cylinder contact surfaces of cast engine blocks or of internal combustion engines. The inner torch has two torch tubes 3 for heating electrodes. The torch tubes 3 are arranged within supply tubes 1, by means of which the main transporting direction of the wire-like electrodes is defined.

The electrodes are wires to be melted in an electric arc. By means of a process gas, the gas feed of which is also arranged, in particular, in supply tubes 1, the droplets forming from the molten wires are transported, preferably also sprayed, in the direction of the cavity surface which is to be coated.

The flow of the process gas passing out of the nozzle head 2 and transporting the droplets, referred to as the main gas direction for the sake of simplicity hereinbelow, is arranged transversely to the main transporting direction of the wires.

In order for the electric arc to form between the ends of the wires, the two wires are guided towards one another, in accordance with the torch tubes 3, at the outlet. Heating takes place by the wires being bent about a first axis located transversely to the main transporting direction of the wires.

Furthermore, the wires come into contact with one another in the region of the flow of the process gas passing out of the nozzle head 2, as a result of which the electric arc of the electrode wires is also located in this region.

In addition to being bent towards one another, the wires are also bent, in the region of the nozzle head 2, about a second axis, which is arranged transversely both to the first axis and to the main transporting direction of the wires. This measure renders the electric arc largely positionally stable in relation to the inner torch, for which reason presumably the quality of the layer deposited on the substrate is very good.

Thus, in addition to being bent towards one another, the wires are also bent in the direction of the main gas direction. The acute angle between the main gas direction and the wire transporting direction in the vicinity of the burning point is, in the vicinity of the electric arc, expediently between 0° and 30°, preferably between 20° and 1° and particularly preferably between 10° and 1°.

In order that the constant transportation of the wires, which is necessary during use, can be carried out with the lowest possible level of force, at least the additional bending of the wires takes place with gentle curvature in the direction of the main gas direction of the discharged process gas.

The inner torch is designed as a closed torch and has a nozzle 4. The electric arc (burning point) is arranged in the region of the opening of the nozzle, preferably upstream of the location at which the gas flow is discharged from the nozzle 4.

The droplet through the nozzle 4 is favourably formed such that the gas/material flow is passing out of the nozzle 4 through the opening has a spreading angle between 10° and 45°, preferably between 15° and 30°.

In order to form the gas/material flow, a plurality of secondary openings are also arranged in the nozzle 4 alongside the main opening, said secondary openings being designed, in particular, in the form of preferably conical bores and/or as annular gaps. The secondary openings are arranged, in particular, concentrically around the main opening, the inside width of the secondary openings being smaller than that of the main opening.

The (forming) gas supply to the secondary openings may take place in that a gas sub-flow is branched off from the gas flow from the main opening. Greater variability can be achieved in that the secondary openings are supplied with a different pressure/gas from the main opening.

This can be achieved not just by pressure control of the branched-off gas sub-flow, but also by the gas supply to the secondary openings being separate from the gas supply to the main opening.

It may further be advantageous, in relation to the above-mentioned measures, if a combustible and/or inert gas are/is also blown in the direction of the burning point, which would be combined, for example, with an increased in the temperature of the plasma and/or shielding of the molten materials. These gases are expediently blown in with flow similar to, or the same as, the main flow direction.

Furthermore, it is also possible for further materials, such as dry lubricants, hard materials, etc., preferably in powder form, to be introduced in the direction of the surface which is to be coated. It is mostly expedient here for these materials likewise to be directed through the burning point. In this case, heating advantageously takes place through a transporting channel, the opening of which is arranged, in the vicinity of the burning point, the region of the main nozzle opening.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An inner torch for the electric-arc spraying of cylinder contact surfaces, comprising at least two torch tubes for heating wire electrodes, which electrodes provided for melting purposes and are burnt away in an electric arc;

a gas feed for a process gas which is provided for transporting and spraying molten wire material in the direction of a cavity surface to be coated, wherein the wires are guided towards one another, by way of the torch tubes, at an outlet and in a region of the electric arc, and the electric arc of the electrode wires, which is arranged in the contact region of the wires, is positioned in a region of the flow of discharged process gas and wherein the flow of discharged process gas, in a main gas direction, is arranged transversely to a main transporting direction of the wires, and wherein the wire electrodes are bent about a first axis toward one another and are also additionally bent about a second axis transversely to said main transporting direction and said first axis.

2. The inner torch according to claim 1, wherein, in the vicinity of the electric arc, the wires enclose an acute angle with the main gas direction.

3. The inner torch according to claim 2, wherein the acute angle between the main gas flow direction and the wire transporting direction in the vicinity of the burning point is between 0° and 30°.

4. The inner torch according to claim 2, wherein the acute angle between the main gas flow direction and the wire transporting direction in the vicinity of the burning point is between 20° and 1°.

5. The inner torch according to claim 2, wherein the acute angle between the main gas flow direction and the wire transporting direction in the vicinity of the burning point is between 10° and 1°.

6. The inner torch according to claim 1, wherein the additional bending has gentle curvature in the direction of the main gas direction of the discharged process gas.

7. The inner torch according to claim 1, wherein the inner torch is a closed torch, and the inner torch has a nozzle, and wherein the electric arc is positioned in the region of the opening of the nozzle.

8. The inner torch according to claim 7, wherein a gas/material flow passing out of the nozzle through the opening has a spreading angle between 10° and 45°.

9. The inner torch according to claim 7, wherein a gas/material flow passing out of the nozzle through the opening has a spreading angle between 15° and 30°.

10. The inner torch according to claim 7, wherein the nozzle has a main opening and a plurality of secondary openings arranged concentrically around the main opening, and an inside width of the plurality of secondary openings is smaller than a width of the main opening.

11. The inner torch according to claim 10, wherein gas flow from the secondary openings is branched off from gas flow from the main opening.

12. The inner torch according to claim 10, wherein the gas supply to the secondary openings is separate from the gas supply to the main opening.

13. The inner torch according to claim 10, wherein the secondary openings are supplied with at least one of a different pressure and a different gas than supplied from the main opening.

14. The inner torch according to claim 1, wherein the inner torch is a closed torch, and the inner torch has a nozzle, and wherein the electric arc is positioned upstream of the location where the gas flow is discharged from the nozzle.

* * * * *